United States Patent
Naughton et al.

(10) Patent No.: US 9,511,923 B2
(45) Date of Patent: *Dec. 6, 2016

(54) POWERED DISPENSING TOOL

(71) Applicant: Milwaukee Electric Tool Corporation, Brookfield, WI (US)

(72) Inventors: Michael Naughton, Oconomowoc, WI (US); Troy C. Thorson, Cedarburg, WI (US); Brandon L. Verbrugge, Brookfield, WI (US); William E. Check, Milwaukee, WI (US); Thomas G. Simeone, Milwaukee, WI (US); Scott D. Eisenhardt, Pewaukee, WI (US); Scott Schneider, Waukesha, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 252 days.

This patent is subject to a terminal disclaimer.

(21) Appl. No.: 14/253,352

(22) Filed: Apr. 15, 2014

(65) Prior Publication Data

US 2014/0224831 A1   Aug. 14, 2014

Related U.S. Application Data

(63) Continuation of application No. 13/296,732, filed on Nov. 15, 2011, now Pat. No. 8,740,021.

(Continued)

(51) Int. Cl.
  *B65D 83/00*  (2006.01)
  *G01F 11/00*  (2006.01)
  *G01F 11/02*  (2006.01)

(52) U.S. Cl.
  CPC ............ *B65D 83/0005* (2013.01); *G01F 11/00* (2013.01); *G01F 11/022* (2013.01); *G01F 11/026* (2013.01); *G01F 11/029* (2013.01)

(58) Field of Classification Search
  USPC .......... 222/504, 333, 386, 390, 326–327, 63
  See application file for complete search history.

(56) References Cited

U.S. PATENT DOCUMENTS

| 966,861 A | 8/1910 | Rubly |
| 1,269,438 A | 6/1918 | Hieatzman |

(Continued)

FOREIGN PATENT DOCUMENTS

| CA | 2570384 | 12/2005 |
| DE | 3811954 | 10/1989 |

(Continued)

OTHER PUBLICATIONS

Cox, Product Catalog, 2004 (16 pages).

(Continued)

*Primary Examiner* — Donnell Long
(74) *Attorney, Agent, or Firm* — Michael Best & Friedrich LLP

(57) ABSTRACT

A powered dispensing tool includes a housing, a motor positioned within the housing, a rack coupled to the motor for powered translation in at least one of a forward direction and a reverse direction, and a transmission selectively coupling the motor and the rack. The transmission includes an input ring rotatable in response to rotation of the motor in a first direction corresponding with powered translation of the rack in the forward direction, a first clutch member engaged with the rack through an intermediate gear, and a second clutch member that receives torque from the input ring and that is movable in response to rotation of the motor in the first direction toward a first position engaging the first clutch member. The second clutch member is also movable in response to rotation of the motor in an opposite, second direction toward a second position disengaged from the first clutch member.

20 Claims, 12 Drawing Sheets

Related U.S. Application Data

(60) Provisional application No. 61/413,734, filed on Nov. 15, 2010, provisional application No. 61/524,655, filed on Aug. 17, 2011.

(56) References Cited

U.S. PATENT DOCUMENTS

| | | |
|---|---|---|
| 3,208,638 A | 9/1965 | Frenzel et al. |
| 3,300,100 A | 1/1967 | Sundholm |
| 3,341,084 A | 9/1967 | Sundholm |
| 3,341,085 A | 9/1967 | Sundholm |
| 3,640,431 A | 2/1972 | Plumer |
| 3,730,394 A | 5/1973 | Woodson |
| 3,768,472 A | 10/1973 | Hodosh et al. |
| 3,782,598 A | 1/1974 | Basa |
| 3,813,012 A | 5/1974 | Laird |
| 3,854,629 A * | 12/1974 | Blieberger .......... B05C 17/0103 222/109 |
| 3,870,200 A | 3/1975 | Spatz |
| 3,997,085 A | 12/1976 | Lindquist |
| 4,113,151 A | 9/1978 | Brown et al. |
| 4,135,644 A | 1/1979 | Pacetti |
| 4,171,072 A | 10/1979 | Davis, Jr. |
| 4,260,076 A | 4/1981 | Bergman |
| 4,277,194 A | 7/1981 | Smith |
| 4,322,022 A * | 3/1982 | Bergman ............ B05C 17/0103 222/327 |
| 4,330,070 A | 5/1982 | Doubleday |
| 4,335,834 A * | 6/1982 | Zepkin ................ B05C 17/0103 222/327 |
| 4,339,058 A | 7/1982 | Wendt |
| 4,556,156 A | 12/1985 | Frutin |
| 4,570,832 A | 2/1986 | Kroger |
| 4,583,934 A | 4/1986 | Hata et al. |
| 4,595,124 A | 6/1986 | Duval et al. |
| 4,615,469 A | 10/1986 | Kishi et al. |
| 4,715,518 A | 12/1987 | Moore |
| 4,811,824 A | 3/1989 | Kurihara |
| 4,840,293 A | 6/1989 | Segatz |
| 4,854,485 A | 8/1989 | Collins |
| 4,871,088 A | 10/1989 | Cox |
| 4,872,596 A | 10/1989 | Corsette |
| 4,877,156 A | 10/1989 | Clanet et al. |
| 4,890,773 A | 1/1990 | Corsette |
| 4,907,727 A | 3/1990 | Ernst et al. |
| 4,986,454 A | 1/1991 | Riley |
| 5,027,984 A | 7/1991 | Gakhar et al. |
| 5,060,733 A | 10/1991 | Kress |
| 5,088,630 A | 2/1992 | Arch et al. |
| 5,139,178 A | 8/1992 | Arch et al. |
| 5,161,715 A | 11/1992 | Giannuzzi |
| 5,176,291 A | 1/1993 | Fillmore et al. |
| 5,240,152 A | 8/1993 | Scholz |
| 5,273,190 A | 12/1993 | Lund |
| 5,295,614 A | 3/1994 | Chang |
| 5,323,931 A | 6/1994 | Robards, Jr. et al. |
| 5,341,958 A * | 8/1994 | Bayat ................ B05C 17/0103 222/333 |
| 5,353,962 A | 10/1994 | Scholz et al. |
| 5,370,271 A | 12/1994 | Segatz |
| 5,390,831 A | 2/1995 | Schneider |
| 5,405,054 A | 4/1995 | Thomas |
| 5,413,255 A | 5/1995 | Dent |
| 5,419,466 A | 5/1995 | Scheindel |
| 5,441,175 A | 8/1995 | Jacobsen et al. |
| 5,492,249 A | 2/1996 | Beach |
| 5,556,009 A | 9/1996 | Motzko |
| 5,593,066 A | 1/1997 | Konuma et al. |
| 5,699,935 A | 12/1997 | Stahley |
| 5,775,533 A | 7/1998 | Schroeder |
| 5,775,539 A | 7/1998 | Bates et al. |
| 5,788,123 A | 8/1998 | Hackmann et al. |
| 5,826,751 A | 10/1998 | Stahley et al. |
| 5,842,604 A | 12/1998 | Stahley et al. |
| 5,860,568 A | 1/1999 | Mallalieu et al. |
| 5,871,299 A * | 2/1999 | Lai .................... B05C 17/0103 222/327 |
| 5,897,028 A | 4/1999 | Sauer |
| 5,909,830 A | 6/1999 | Bates et al. |
| 6,039,215 A | 3/2000 | Bell |
| 6,039,216 A | 3/2000 | Cummings |
| 6,053,293 A | 4/2000 | Sato et al. |
| 6,082,597 A | 7/2000 | Beckett et al. |
| 6,123,235 A | 9/2000 | Hsu |
| 6,152,334 A | 11/2000 | Liardon et al. |
| 6,220,485 B1 | 4/2001 | Chang |
| 6,241,130 B1 | 6/2001 | Heiberger |
| 6,299,022 B1 | 10/2001 | Bublewitz et al. |
| 6,321,951 B1 | 11/2001 | Frutin |
| 6,338,404 B1 | 1/2002 | Chen |
| 6,386,400 B1 | 5/2002 | Scheindel |
| 6,415,955 B1 | 7/2002 | Ostreicher |
| 6,454,129 B1 | 9/2002 | Green |
| 6,474,510 B2 | 11/2002 | Frutin |
| 6,478,190 B2 | 11/2002 | Kuge et al. |
| 6,488,180 B1 | 12/2002 | Bayat |
| 6,494,345 B2 | 12/2002 | Schrader |
| 6,494,662 B1 | 12/2002 | De Montalembert |
| 6,508,385 B1 | 1/2003 | Liardon |
| 6,578,738 B1 | 6/2003 | Keller |
| 6,634,524 B1 | 10/2003 | Helmenstein |
| 6,701,828 B1 | 3/2004 | Burns et al. |
| 6,742,722 B2 | 6/2004 | Hosoda et al. |
| 6,745,921 B2 | 6/2004 | Beckett |
| 6,752,293 B2 | 6/2004 | So |
| 6,789,707 B2 | 9/2004 | Wright |
| 6,889,872 B2 | 5/2005 | Herman et al. |
| 7,056,307 B2 | 6/2006 | Smith |
| 7,163,130 B2 | 1/2007 | Lafond |
| 7,192,267 B2 | 3/2007 | Glucksman et al. |
| 7,420,341 B2 | 9/2008 | Glasgow et al. |
| 7,431,136 B2 | 10/2008 | Simm et al. |
| 7,445,135 B2 | 11/2008 | Miyata et al. |
| 7,637,392 B2 | 12/2009 | Hsu et al. |
| 7,690,530 B2 | 4/2010 | Schneider et al. |
| 7,784,459 B2 | 8/2010 | Abrams |
| 7,913,881 B2 | 3/2011 | Herman |
| 8,011,538 B2 | 9/2011 | Herman et al. |
| 8,020,727 B2 | 9/2011 | Herman et al. |
| 8,740,021 B2 | 6/2014 | Naughton et al. |
| 9,045,270 B2 * | 6/2015 | Kimura ............... B05C 17/0103 |
| 2001/0042762 A1 | 11/2001 | Reichert |
| 2005/0051571 A1 | 3/2005 | Carruth et al. |
| 2005/0150735 A1 | 7/2005 | Donner |
| 2007/0235475 A1 | 10/2007 | Schneider et al. |
| 2008/0197154 A1 | 8/2008 | Herman et al. |
| 2009/0039113 A1 | 2/2009 | Hsu et al. |
| 2009/0065527 A1 | 3/2009 | Buck |
| 2009/0071986 A1 * | 3/2009 | Wang .................. G01F 11/026 222/333 |
| 2009/0110786 A1 | 4/2009 | Wells |
| 2009/0179045 A1 | 7/2009 | Cadden |
| 2009/0272761 A1 | 11/2009 | Cadden |
| 2009/0272767 A1 | 11/2009 | Herman et al. |
| 2009/0277970 A1 | 11/2009 | Lind et al. |
| 2009/0302055 A1 | 12/2009 | Cadden et al. |
| 2010/0006605 A1 | 1/2010 | Sung et al. |
| 2011/0278327 A1 | 11/2011 | Herman et al. |

FOREIGN PATENT DOCUMENTS

| | | |
|---|---|---|
| EP | 0836534 | 9/2002 |
| EP | 2096330 | 9/2009 |
| WO | 0171293 | 9/2001 |
| WO | 2006015596 | 2/2006 |

OTHER PUBLICATIONS

Cox, Catalogs, Apr. 4, 2005, (date according to waybackmachine.com), {Retrieved May 24, 2011} Retrieved from the Internet <URL: http://www.cox-applicators.com/catalogs.asp>.

(56) References Cited

OTHER PUBLICATIONS

Milwaukee Electric Tool Corporation, 14.4V Cordless Caulk & Adhesive Gun Kits, Online Product Sheet, Jun. 25, 2006, (date according to waybackmachine.com), {Retrieved on May 24, 2011) Retrieved from the Internet <URL: http://www.mytoolstore.com/milwauke/6562>.

Milwaukee Electric Tool Corporation, Tool Catalog: Heavy-Duty Caulk & Adhesive Guns, 2003 (3 pages).

Milwaukee Electric Tool Corporation, Cordless 2.4 Volt Screwdriver and Cordless 2.4 Volt Caulking Gun, 1997 (2 pages).

Milwaukee Electric Tool Corporation, 14.4 Cordless Caulk Gun Service Parts List, Oct. 2006 ( 2 pages).

Milwaukee Electric Tool Corporation, 14.4 Cordless Caulk Gun Operator's Manual, Oct. 2006 (21 pages).

International Search Report and Written Opinion for Application No. PCT/US2011/060766 dated Jun. 28, 2012 (7 pages).

\* cited by examiner

POWERED DISPENSING TOOL

CROSS-REFERENCE TO RELATED APPLICATIONS

This application is a continuation of co-pending U.S. patent application Ser. No. 13/296,732 filed on Nov. 15, 2011, which claims priority to U.S. Provisional Patent Application Nos. 61/413,734 filed on Nov. 15, 2010 and 61/524,655 filed on Aug. 17, 2011, the entire contents of all of which are incorporated herein by reference.

FIELD OF THE INVENTION

The present invention relates to power tools, and more particularly to powered dispensing tools

BACKGROUND OF THE INVENTION

Dispensing tools, such as those used for dispensing caulk, adhesives, or like materials, are typically manually operated by squeezing or grasping a handle of the dispensing tool. The handle is typically connected to a rack via an advancing mechanism (e.g., a ratchet and pawl-type mechanism) to incrementally advance the rack and cause the caulk, adhesive, or like material to be discharged from a cartridge. Such manually operated dispensing tools can be difficult to control and strenuous, thereby fatiguing the user and possibly shortening the duration of time the manually operated dispensing tool may be used before the user requires rest.

SUMMARY OF THE INVENTION

The invention provides, in one aspect, a powered dispensing tool including a housing, a motor at least partially positioned within the housing, a rack operably coupled to the motor for powered translation in at least one of a forward direction and a reverse direction, and a transmission selectively operably coupling the motor and the rack. The transmission includes an input ring rotatable in response to rotation of the motor in a first direction corresponding with powered translation of the rack in the forward direction, a first clutch member engaged with the rack through at least one intermediate gear, and a second clutch member that receives torque from the input ring and that is movable in response to rotation of the motor in the first direction toward a first position engaging the first clutch member. The second clutch member is also movable in response to rotation of the motor in an opposite, second direction toward a second position disengaged from the first clutch member.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
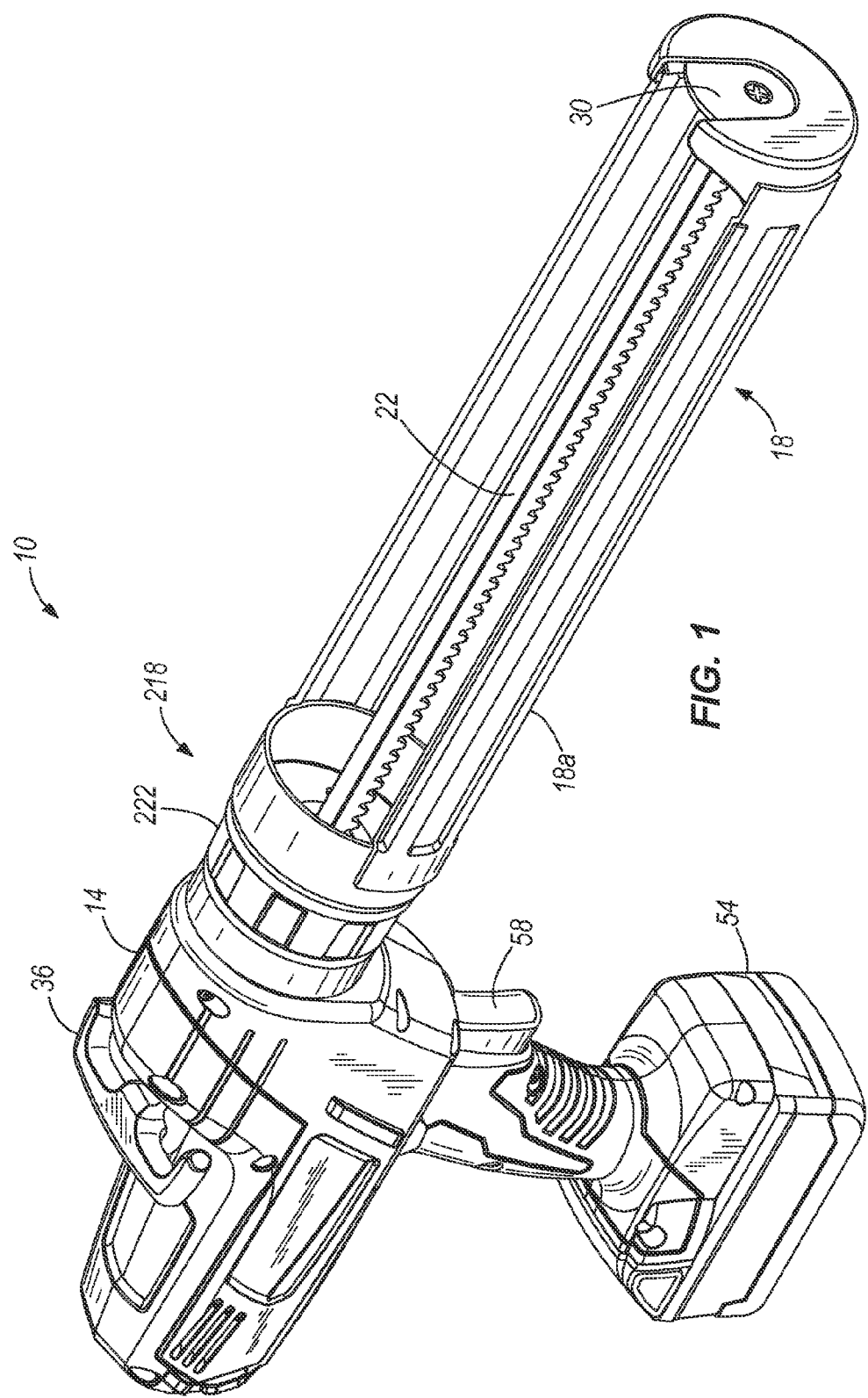
FIG. 1 is a front perspective view of a powered dispensing tool according to an embodiment of the invention.
Figure 2:
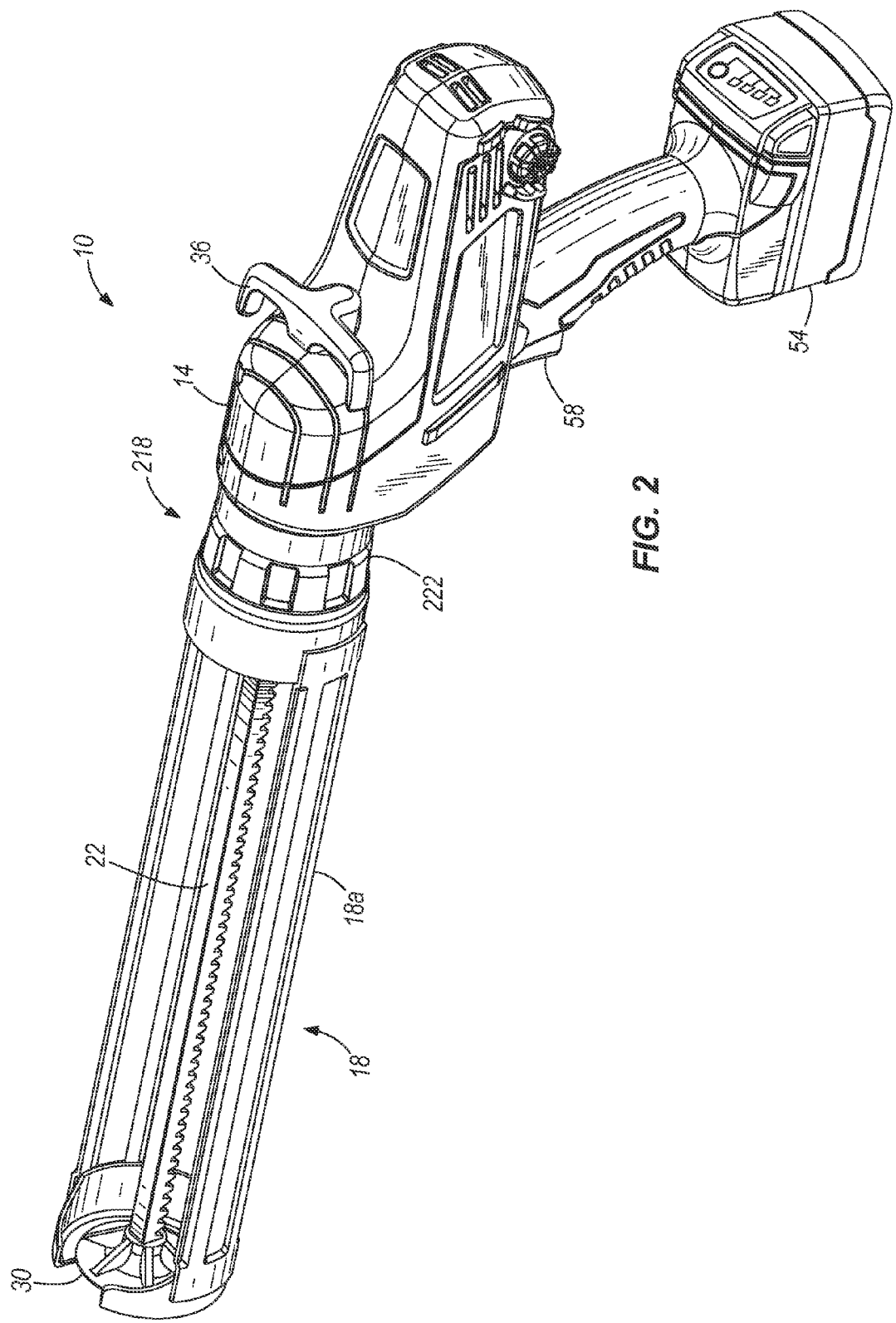
FIG. 2 is a rear perspective view of the powered dispensing tool of FIG. 1.

A powered dispensing tool 10 according to an embodiment of the invention is shown in FIGS. 1 and 2. The tool 10 includes a main housing 14 and a cartridge housing 18 attached to the main housing 14 for supporting a tubular cartridge of caulk, adhesive, or other material to be dispensed. The tool 10 also includes a rack 22 having a first end 26 coupled to a plunger 30 and a second end 34 accessible from the rear of the main housing 14. A handle 36 is coupled to the second end 34 of the rack 22 to facilitate grasping the rack 22 to manually advance or retract the rack 22 relative to the main housing 14. As will be described in greater detail below, the plunger 30 is movable within the cartridge housing 18 in response to the rack 22 being driven or otherwise moved in a forward or reverse direction.

Figure 3:
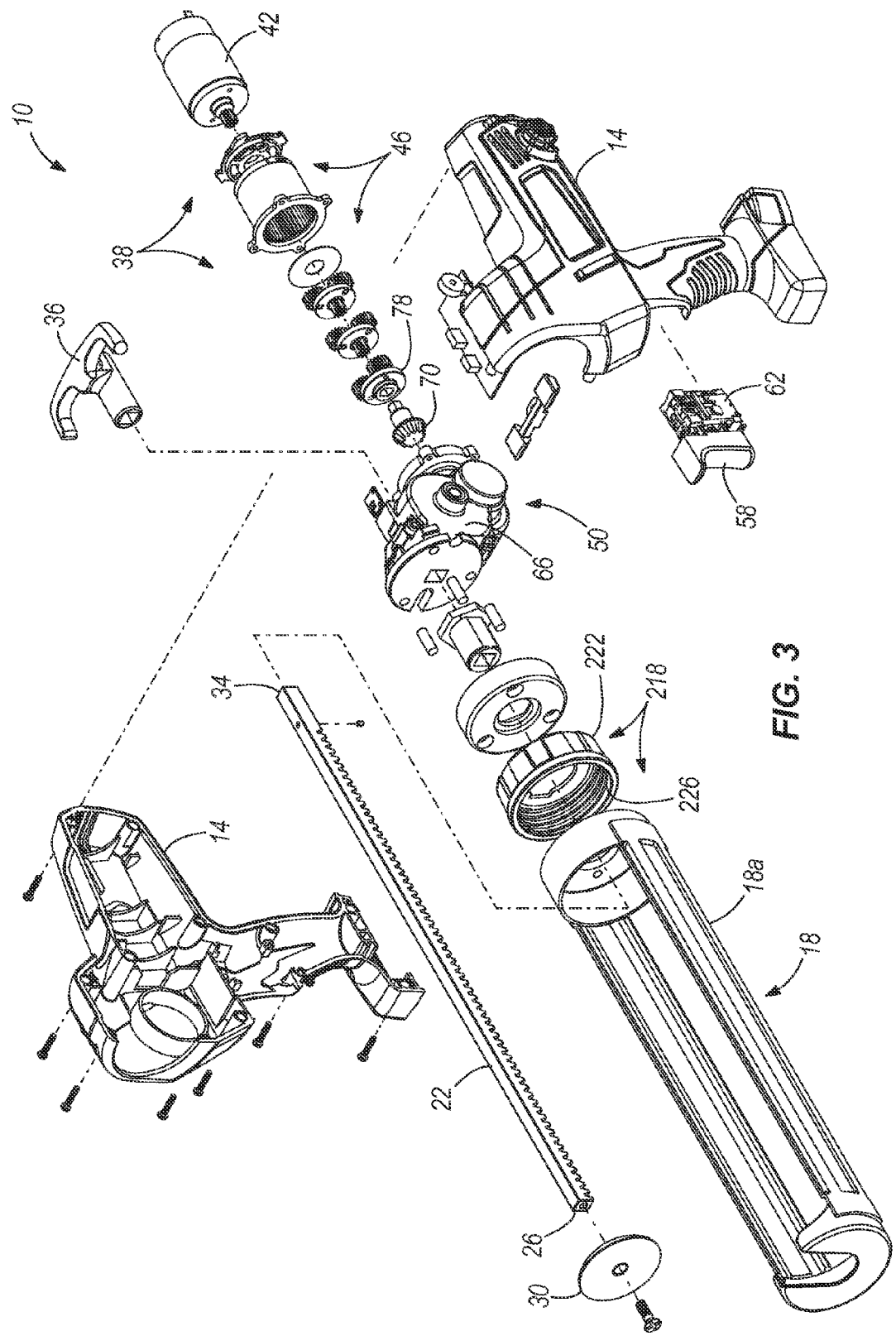
FIG. 3 is an exploded, front perspective view of the powered dispensing tool of FIG. 1.

With reference to FIG. 3, the tool 10 includes a power train assembly 38 positioned within the main housing 14. The power train assembly 38 includes an electric motor 42, a three-stage planetary transmission 46, and a transmission 50 for converting the rotational output of the planetary transmission 46 to a translational output of the rack 22. In the illustrated construction of the tool 10, the motor 42 is configured as a DC motor that receives power from an on-board power source (e.g., a battery 54). The battery 54 may include any of a number of different nominal voltages (e.g., 12V, 18V, etc.), and may be configured having any of a number of different chemistries (e.g., lithium-ion, nickel-cadmium, etc.). Alternatively, the motor 42 may be powered by a remote power source (e.g., a household electrical outlet) through a power cord. The motor 42 is selectively activated by depressing a trigger 58 which, in turn, actuates a switch 62. The switch 62 may be electrically connected to the motor 42 via a top-level or master controller or one or more circuits as described below and shown in FIG. 12.

Figure 4:
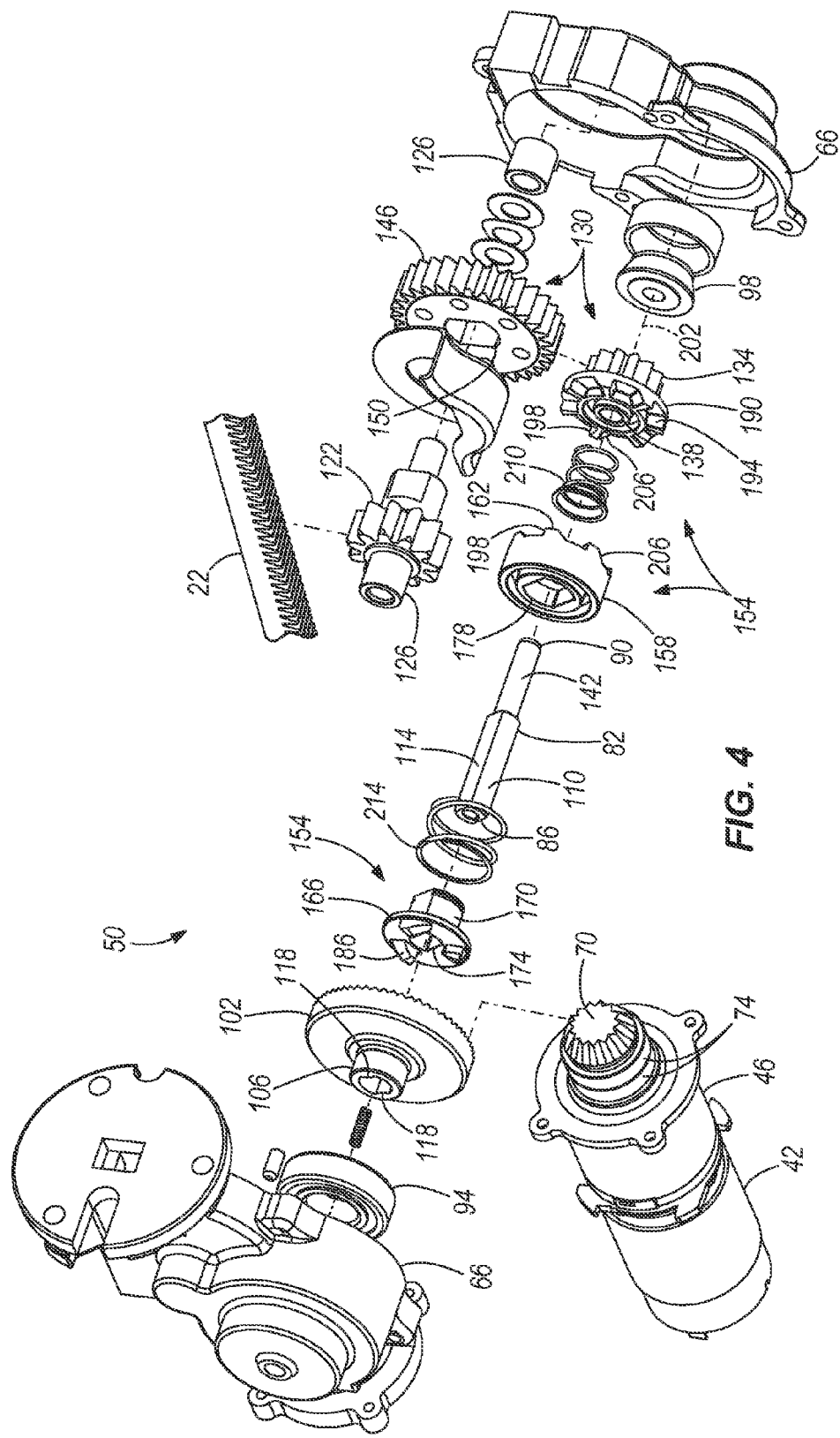
FIG. 4 is an exploded, front perspective view of a transmission in the powered dispensing tool of FIG. 1.
Figure 5:
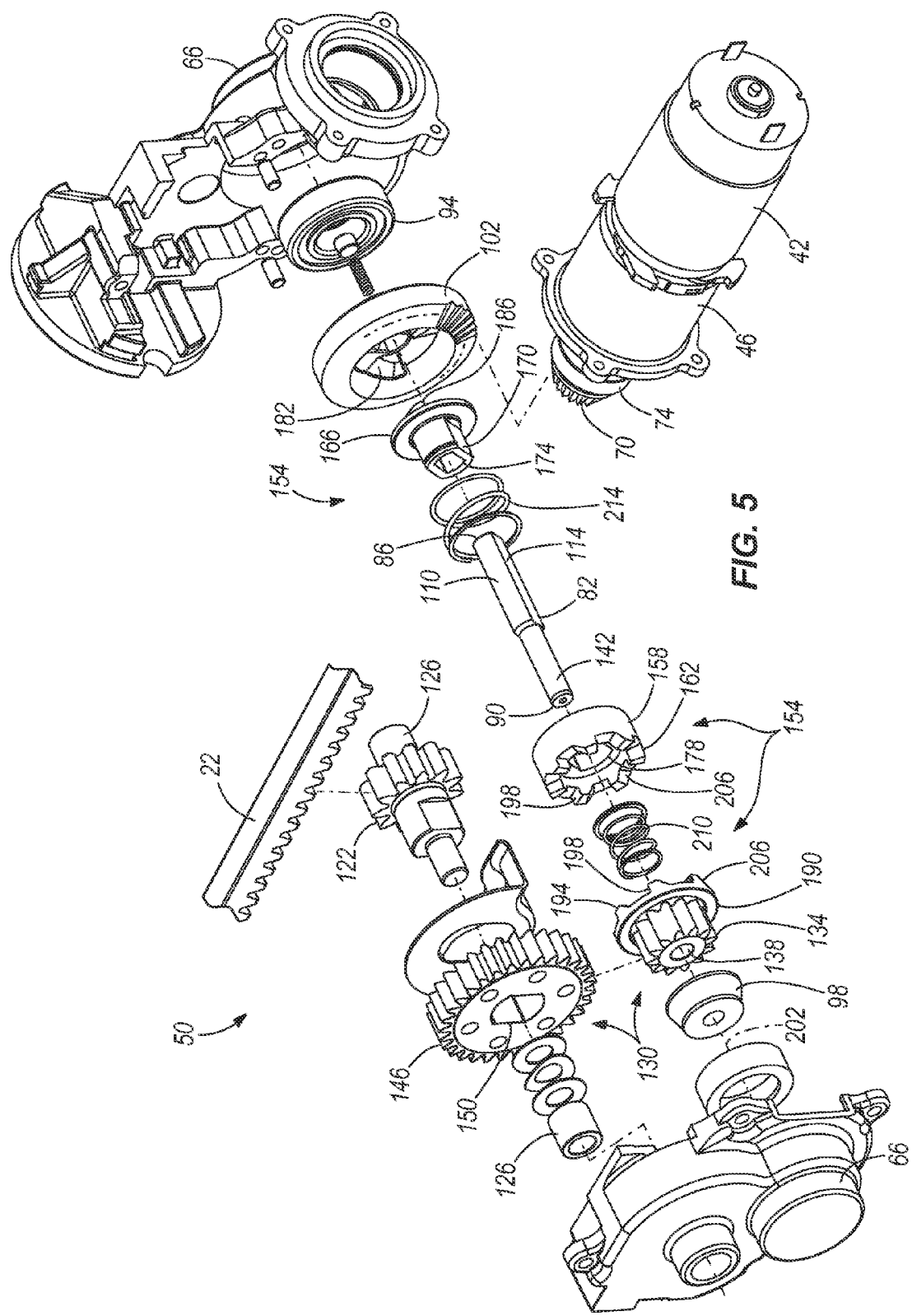
FIG. 5 is an exploded, rear perspective view of the transmission of FIG. 4.

With reference to FIGS. 4 and 5, the transmission 50 includes a transmission housing 66 and a pinion 70 supported for rotation in the transmission housing 66 by two roller bearings 74. The pinion 70 is coupled to an output carrier 78 of the planetary transmission 46 (FIG. 3) to receive torque therefrom. With reference to FIG. 4, the transmission 50 also includes a drive shaft 82 having opposed ends 86, 90 supported for rotation in the transmission housing 66 by respective bearings 94, 98, and an input ring 102 engaged with the pinion 70 and positioned coaxial with the drive shaft 82. The input ring 102 includes a hub 106 having a cylindrical outer periphery received within the inner race of the bearing 94 to journal the input ring 102 relative to the transmission housing 66. A drive portion 110 of the drive shaft 82 includes parallel flats 114, and the hub 106 of the input ring 102 includes opposed, convex lugs 118 that are engageable with the respective flats 114. As a result of this arrangement, the input ring 102 may be rotated by the pinion 70 relative to the drive shaft 82 a particular amount (e.g., 40 degrees) before the lugs 118 come into engagement with the respective flats 114, after which time the drive shaft 82 and the input ring 102 will co-rotate.

With reference to FIGS. 4 and 5, the transmission 50 also includes an output gear 122 engaged with the rack 22 and supported for rotation in the transmission housing 66 with bushings 126, and a speed-reducing gear train 130 coupled to the output gear 122. In the illustrated construction of the tool 10, the gear train 130 includes a first gear 134 having a cylindrical aperture 138 through which a cylindrical portion 142 of the drive shaft 82 is inserted. As such, the first gear 134 is journaled for rotation relative to the cylindrical portion 142 of the drive shaft 82. The gear train 130 also includes a second gear 146 having a non-circular aperture 150 in which a portion of the output gear 122 having a corresponding non-circular cross-sectional shape is received. As such, the output gear 122 and the second gear 146 of the gear train 130 are coupled for co-rotation. An interference or press-fit may be utilized to secure the output gear 122 to the second gear 146. Alternatively, any of a number of different mechanical fasteners may be utilized to secure the output gear 122 to the second gear 146, or as a further alternative, the output gear 122 may be integrally formed with the second gear 146 as a single piece.

With continued reference to FIGS. 4 and 5, the transmission 50 further includes a clutch 154 that is engaged in response to rotation of the motor 42 in a first direction corresponding with powered translation of the rack 22 in a forward or advancing direction to dispense material from a cartridge supported in the cartridge housing 18. The clutch 154 includes a clutch or an input member 158 having a plurality of axially extending teeth 162 and a slide member 166 positioned between the input member 158 and the input ring 102. The slide member 166 includes a hub 170 having an aperture 174 with a cross-sectional shape corresponding to that of the drive portion 110 of the drive shaft 82. Accordingly, the slide member 166 is axially slidable on the drive portion 110 and fixed for co-rotation with the drive shaft 82. The input member 158 includes an aperture 178 with a cross-sectional shape corresponding with the outer periphery of the hub 170 on the slide member 166. The hub 170 is received within the aperture 178 in a manner permitting relative axial movement between the slide member 166 and the input member 158, and fixing the input member 158 for co-rotation with the slide member 166. As such, both the input member 158 and the slide member 166 co-rotate with the drive shaft 82 at all times.

With reference to FIG. 5, the input ring 102 includes three ramps 182 (only one of which is visible) extending toward the slide member 166 that are selectively engageable with three corresponding ramps 186 on the slide member 166 (FIG. 4) in response to relative rotation between the input ring 102 and the slide member 166. The slide member 166 is therefore movable along the drive shaft 82 between a retracted position, in which the ramps 182, 186 are misaligned (i.e., not engaged), and an extended position, in which the ramps 182, 186 are aligned (i.e., engaged).

With reference to FIGS. 4 and 5, the clutch 154 also includes a clutch or an output member 190 coupled for co-rotation with the first gear 134 of the speed-reducing gear train 130. In the illustrated construction of the tool 10, the output member 190 is integrally formed with the first gear 134 as a single piece. Alternatively, any of a number of different mechanical connections may be utilized to couple the output member 190 and the first gear 134 (e.g., a press-fit, welding, a key and keyway arrangement, adhesives, fasteners, etc.). The output member 190 shares a hub with the first gear 134, and further includes a circular rim having a plurality of axially extending teeth 194 in facing relationship with the teeth 162 on the input member 158. Sufficient clearance exists between the cylindrical portion 142 of the drive shaft 82 and the output member 190 such that the output member 190 is rotatable, with the first gear 134, relative to the drive shaft 82. Each of the teeth 162, 194 on the respective input and output members 158, 190 includes a drive surface 198 on one side that is oriented generally parallel to a rotational axis 202 of the drive shaft 82, and a ramp surface 206 on the other side that is generally inclined relative to the rotational axis 202. When the input member 158 rotates in a counter-clockwise direction from the frame of reference of FIG. 4 to engage the respective drive surfaces 198 of the teeth 194, torque is transferred from the input member 158 to the output member 190. The ramp surfaces 206 of the respective teeth 162, 194 are not intended to be used during the normal course of operation of the tool 10, but rather are provided as a measure to prevent torque transfer between the input and output members 158, 190 should the output member 190 overrun the input member 158 (e.g., when the rack 22 is manually advanced by the operator of the tool 10).

With reference to FIGS. 4 and 5, the clutch 154 also includes a return spring 210 positioned between the input member 158 and the output member 190 to bias the input member 158 toward the input ring 102, and a delay spring 214 positioned between the slide member 166 and the input member 158. When the slide member 166 is in the extended position, the delay spring 214 biases the input member 158 toward a corresponding extended position to engage the output member 190. However, when the slide member 166 is in the retracted position, the input member 158 is returned to a corresponding retracted position by the return spring 210 such that sufficient spacing exists between the input member 158 and the output member 190 to prevent engagement of the respective teeth 162, 194 on the input and output members 158, 190.

Figure 10:
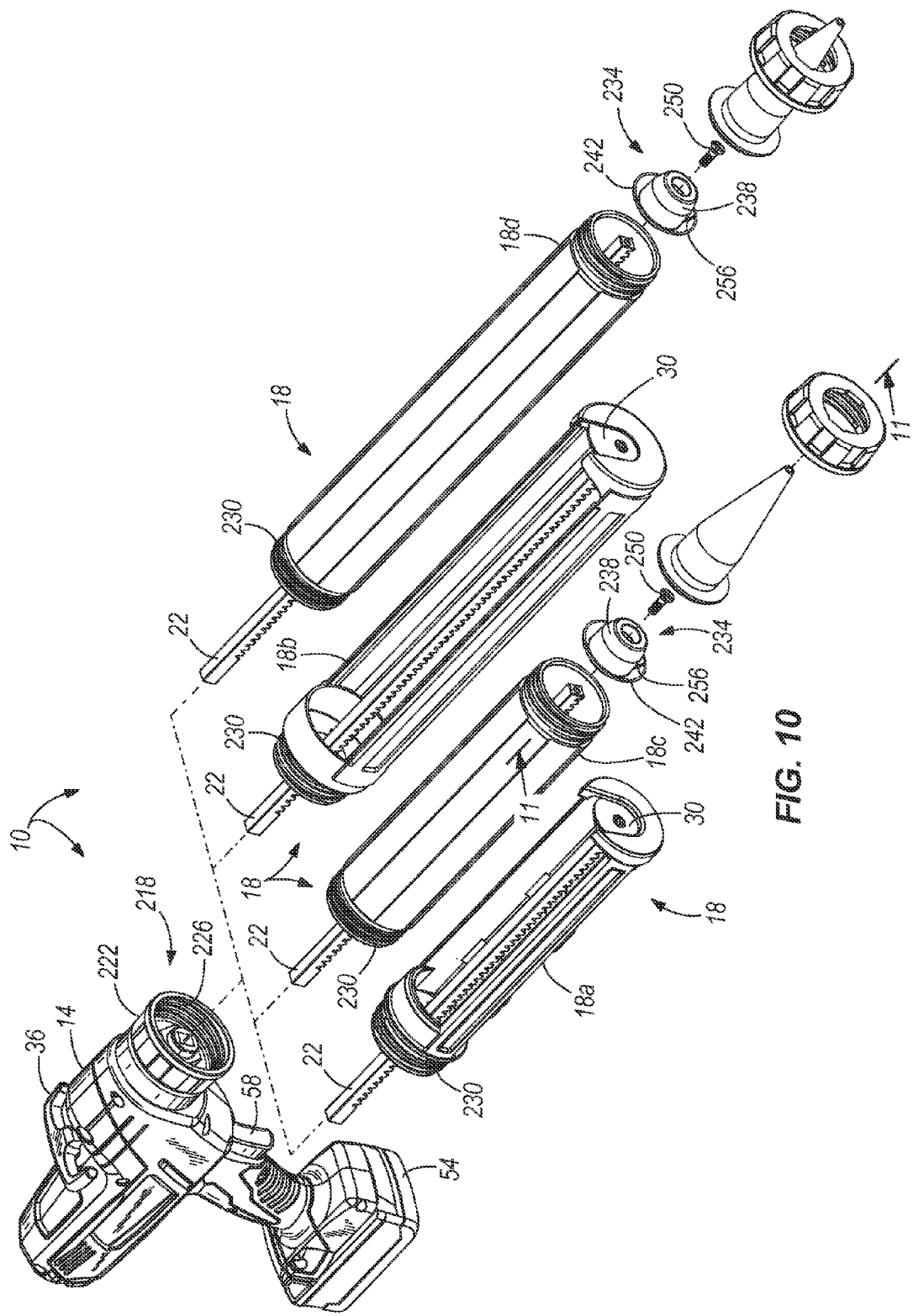
FIG. 10 is a front perspective view of the powered dispensing tool of FIG. 1, illustrating various combinations of cartridge housings and plungers that may be used with the tool.

With reference to FIG. 10, the powered dispensing tool 10 includes a quick-change assembly 218 for adapting different style and size cartridge housings 18 to the main housing 14 of the tool 10 such that the tool 10 may be used with cardboard tube-style cartridges 18*a*, 18*b* or sausage pack cartridges 18*c*, 18*d* of different sizes. In the illustrated construction of the tool 10, the quick-change assembly 218 is configured as a collar 222 with internal threads 226 that is axially secured to the main housing 14 of the tool 10. The collar 222, however, is free to rotate relative to the housing 14. The cartridge housings 18a, 18b are adapted to receive cardboard tube-style cartridges, and the cartridge housings 18c, 18d are adapted to receive sausage pack cartridges. Each of the housings 18 includes a universal connector having external threads 230 that correspond with the internal threads 226 on the collar 222, such that any of the housings 18 may be secured to the main housing 14. No additional structure is utilized to interlock the housings 18 to the collar 222 to inhibit inadvertent removal of any of the housings 18 from the collar 222 and the main housing 14.

Figure 11:
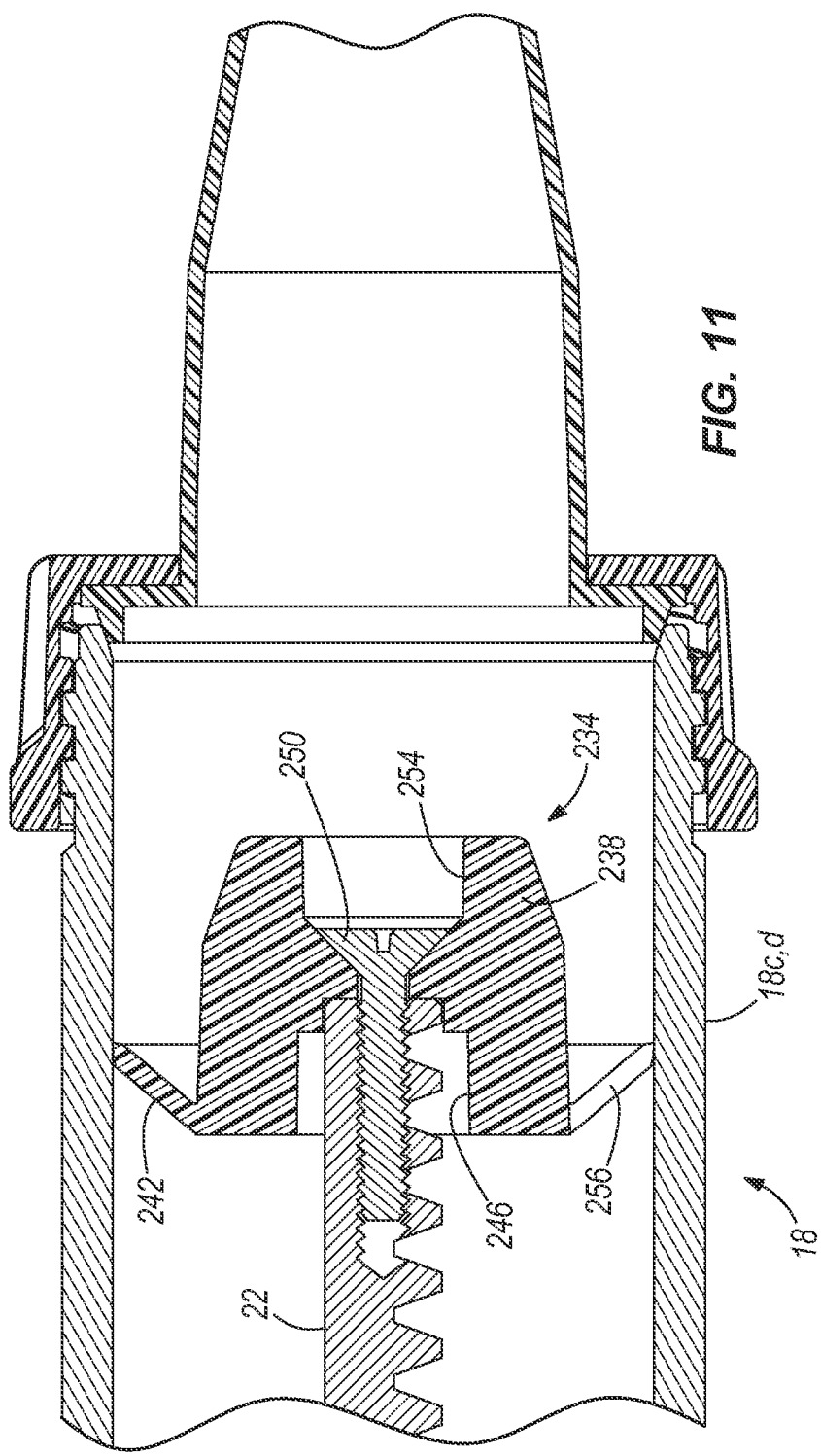
FIG. 11 is an enlarged, cross-sectional view of one of the plungers shown in FIG. 10 attached to the rack.

Likewise, the plunger 30 may be replaced with other plungers having different sizes or configurations than the plunger 30. The plunger 30 illustrated in FIGS. 1 and 2 is configured for use with cardboard tube-style cartridges and either of the cartridge housings 18a, 18b shown in FIG. 10. Another plunger 234 is used in conjunction with the either of the cartridge housings 18c, 18d when dispensing material from a sausage pack. As shown in FIGS. 10 and 11, the plunger 234 includes a central, tapered dome 238 and a circular seal lip 242 extending from the dome 238. The dome 238 includes a cylindrical bore 246 facing the rear end of the plunger in which the rack 22 is received (FIG. 11). A fastener (e.g., a screw 250) is received within a recess 254 facing the forward end of the plunger 234 to secure the plunger 234 to the rack 22. The lip 242 includes a single, radially extending slot 256 (FIGS. 10 and 11) through which air may vent from one side of the plunger 234 to the other side of the plunger 234 when the plunger 234 is situated in one of the sausage pack-style cartridge housings 18c, 18d shown in FIG. 10.

Figure 12:
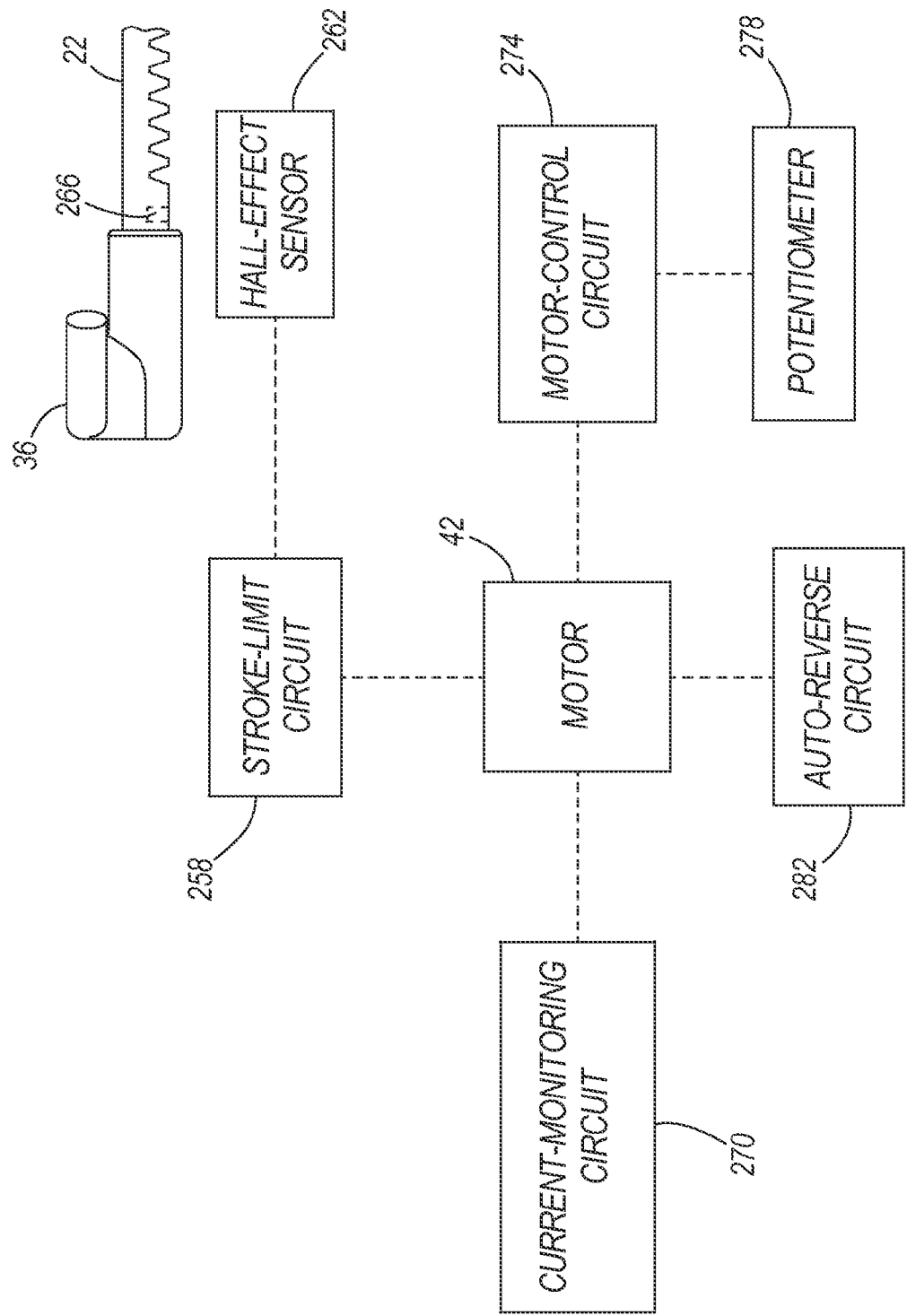
FIG. 12 is a schematic illustrating various electronic components of the powered dispensing tool of FIG. 1.

With reference to FIG. 12, the tool 10 further includes a stroke-limit circuit 258 in electrical communication with the motor 42, a Hall-effect sensor 262 in electrical communication with the stroke-limit circuit 258, and a magnet 266 coupled to the rack 22 at a location proximate the end 34 of the rack 22 opposite the plunger 30. Although not shown, the stroke-limit circuit 258 may be a component, or incorporated as a software program, in a top-level or master controller in the tool 10. Though schematically illustrated in FIG. 12, the magnet 266 may be coupled to the rack 22 in any of a number of different manners (e.g., using a press-fit, adhesives, fasteners, etc.). The magnet 266 may also be at least partially positioned within the rack 22 such that little to none of the magnet 266 is visible from the outer periphery of the rack 22.

Upon detection of the magnetic field emanated by the magnet 266, the Hall-effect sensor 262 is actuated which, in turn, provides a signal to the stroke-limit circuit 258 to deactivate the motor 42. In this manner, the end 34 of the rack 22 opposite the plunger 30 is prevented from impacting the main housing 14 during advancement of the rack 22 or movement of the rack 22 in a forward, material-dispensing direction, thereby defining a predetermined stroke limit to the rack 22 and plunger 30.

With continued reference to FIG. 12, the tool 10 also includes a current-monitoring circuit 270 in electrical communication with the motor 42. Although not shown, the current-monitoring circuit 270 may be a component, or incorporated as a software program, in a top-level or master controller in the tool 10. Alternatively, the current-monitoring circuit 270 may be a separate and stand-alone circuit defined by hardware and not associated with any controllers in the tool 10.

The rack 22 undergoes a relatively slow linear motion for dispensing caulk, adhesives, or other materials from cartridges. This slow linear dispensing speed is produced by reducing the motor speed through the planetary transmission 46 and the speed-reducing gear train 130, followed by the output gear 122 driving the rack 22. In normal operation, the force developed by the rack 22 is within an acceptable range that will not affect the reliability of the tool 10. However, if the rack 22 encounters an obstacle that causes the motor speed to slow dramatically or stall completely, the amount of force developed by the rack 22 will increase substantially over a short period of time. Such an increased force may be large enough to damage to the planetary transmission 46, the rack 22, or the cartridge housing 18. The current-monitoring circuit monitors 270 this force and quickly takes corrective action should the force become too high.

The force developed by the rack 22 is proportional to the torque developed by the motor 42 which, in turn, is proportional to the motor current. Therefore, monitoring motor current provides a very good indication of the force exerted on the rack 22. If a motor current feedback signal rises at a rate higher than a predetermined value, the current-monitoring circuit 270 will cease to drive the motor 42 and the rack 22 in the forward, material-dispensing direction, and will instead drive the motor 42 and the rack 22 in a reverse direction for a short interval before deactivating the motor 42. This condition may occur, for example, if a blockage is encountered within the cartridge which, in turn, prevents material from being discharged from the cartridge. A process for monitoring motor current, which can be implemented in the current-monitoring circuit 270 of FIG. 12, is shown and described in greater detail in published U.S. Patent Application No. 2010/0001017 (the "'017 Publication"), the entire contents of which is hereby incorporated by reference.

With continued reference to FIG. 12, the tool 10 further includes a motor-control circuit 274 in electrical communication with the motor 42. Although not shown, the motor-control circuit 274 may be a component, or incorporated as a software program, in a top-level or master controller in the tool 10. Alternatively, the motor-control circuit 274 may be a separate and stand-alone circuit defined by hardware and not associated with any controllers in the tool 10.

When the trigger 58 is depressed, the motor-control circuit 274 activates the motor 42. However, rather than immediately driving the motor 42 at a predetermined speed, or at a user-selected speed in accordance with the adjustment of a potentiometer 278 (FIG. 12) in communication with the motor-control circuit 274, a soft-start feature of the dispensing tool 10 allows the rack 22, moving in the forward or material-dispensing direction, to be accelerated from rest to the predetermined or user-selected speed over a short period of time (i.e., typically less than one second). The motor-control circuit 274 gradually increases the voltage applied to the motor 42, and in doing so reduces the peak current drawn by the motor 42 during startup. The motor-control circuit 274 also reduces the peak torque delivered by the motor 42 during startup, and therefore provides smoother dispensing of material during startup. Further, incorporating the soft-start feature in the motor-control circuit 274 increases the life expectancy and reduces wear of the tool 10. A process for providing the soft-start feature, which can be implemented in the motor-control circuit 274 of FIG. 12, is shown and described in greater detail in the '017 Publication.

With continued reference to FIG. 12, the tool 10 also includes an auto-reverse circuit 282 in electrical communication with the motor 42. Although not shown, the auto-reverse circuit 282 may be a component, or incorporated as a software program, in a top-level or master controller in the tool 10. Alternatively, the auto-reverse circuit 282 may be a separate and stand-alone circuit defined by hardware and not associated with any controllers in the tool 10.

It is desirable to minimize or eliminate dispensing material from excreting from the tool 10 after operation has ceased. This can be achieved by providing a control scheme for momentarily reversing the rotational direction of the motor 42 after the user has released the trigger 58. After dispensing is halted, the material within the cartridge is allowed to expand within the cartridge to alleviate the residual pressure within the cartridge from the dispensing operation. As is described in greater detail below, momentary reversal of the motor 42 by the auto-reverse circuit 282 causes the clutch 154 to disengage, thereby disconnecting the rack 22 from the motor 42. The plunger 30 and the rack 22 may therefore be pushed rearward by the expanding material within the cartridge without concern of back-driving the motor 42.

When the trigger 58 is actuated again to reactivate the motor 42, the clutch 154 is still disengaged. Initial movement of the motor 42 acts to reengage the clutch 154 as described above before the plunger 30 starts moving toward the tubular cartridge within the cartridge housing 18. In some embodiments, the motor 42 may run for about 0.6 seconds at its highest speed setting to reengage the clutch 154 before the plunger 30 starts moving. In contrast, the motor 42 may run for about 6 seconds at its lowest speed setting to reengage the clutch before the plunger 30 starts moving. In order to minimize this relatively long delay in reengaging the clutch 154, a pre-drive circuit may be incorporated with the motor control circuit 274 for operating the motor 42 at full speed (i.e., at the highest speed setting) for a brief interval when the trigger 58 is actuated, regardless of the operating speed set by the potentiometer 278. The brief interval is slightly less than the amount of time required to reengage the clutch 154 if the motor 42 was run at its highest speed setting. For example, the pre-drive circuit may drive the motor 42 at full speed for about 0.5 seconds if it normally takes the motor 42 about 0.6 seconds to reengage the clutch 154 at the highest speed setting. After the brief interval, the pre-drive circuit reverts the operating speed of the motor 42 to whatever speed the user has set with the potentiometer 278 and the position of the trigger 58. The pre-drive circuit thereby reduces the delay associated with reengaging the clutch 154 prior to material dispensing, while still maintaining the use of the clutch 154 between the motor 42 and the rack 22 to avoid material droop.

In some embodiments, the tool 10 may include a sensor that detects or senses when the clutch 154 is engaged. In such embodiments, the pre-drive circuit may continuously drive the motor 42 at full speed until the sensor detects that the clutch 154 is reengaged.

Figure 6:
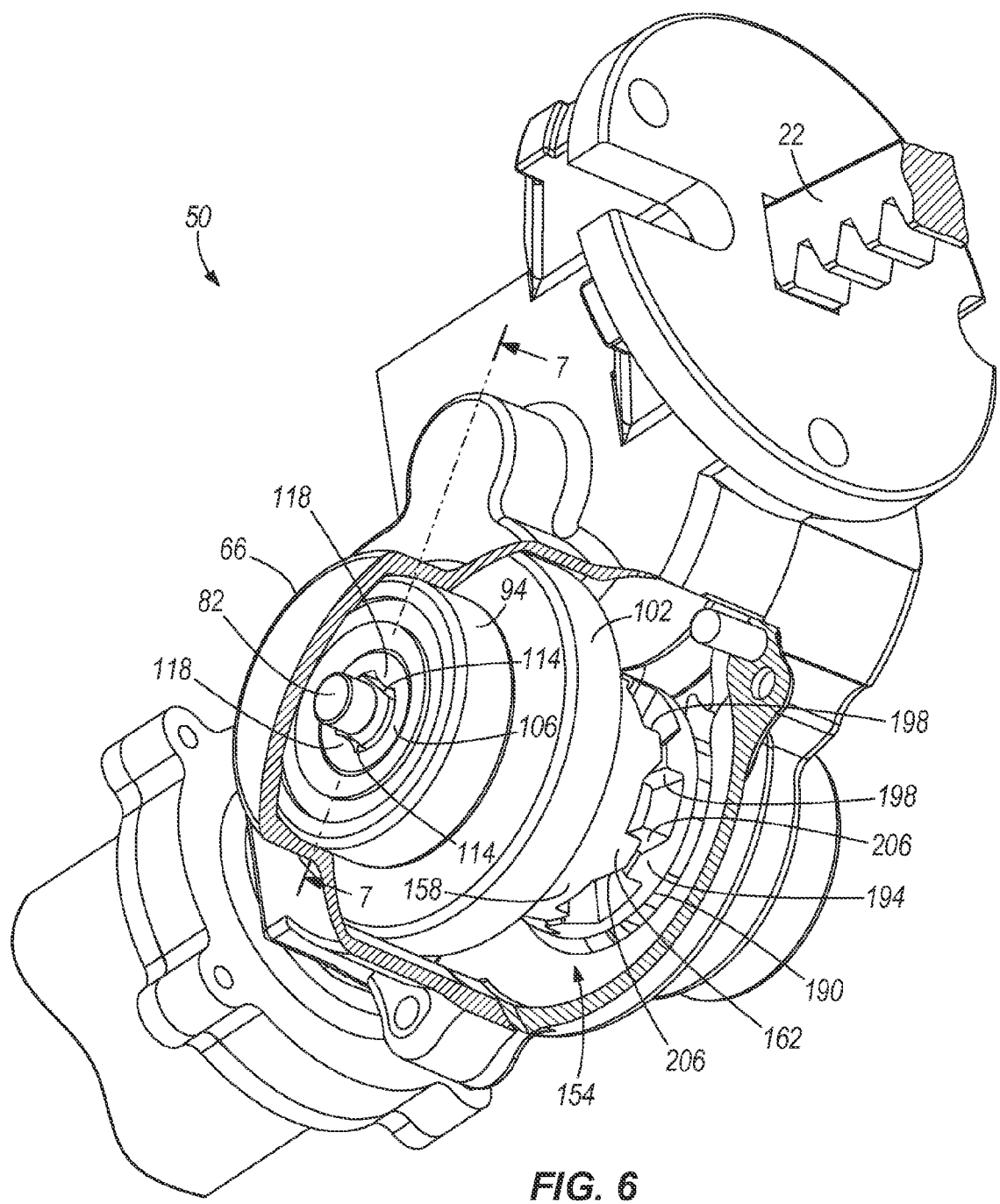
FIG. 6 is a cutaway view of the powered dispensing tool of FIG. 1, illustrating the orientation of an input ring and a drive shaft of the transmission when a motor of the dispensing tool is deactivated.
Figure 7:
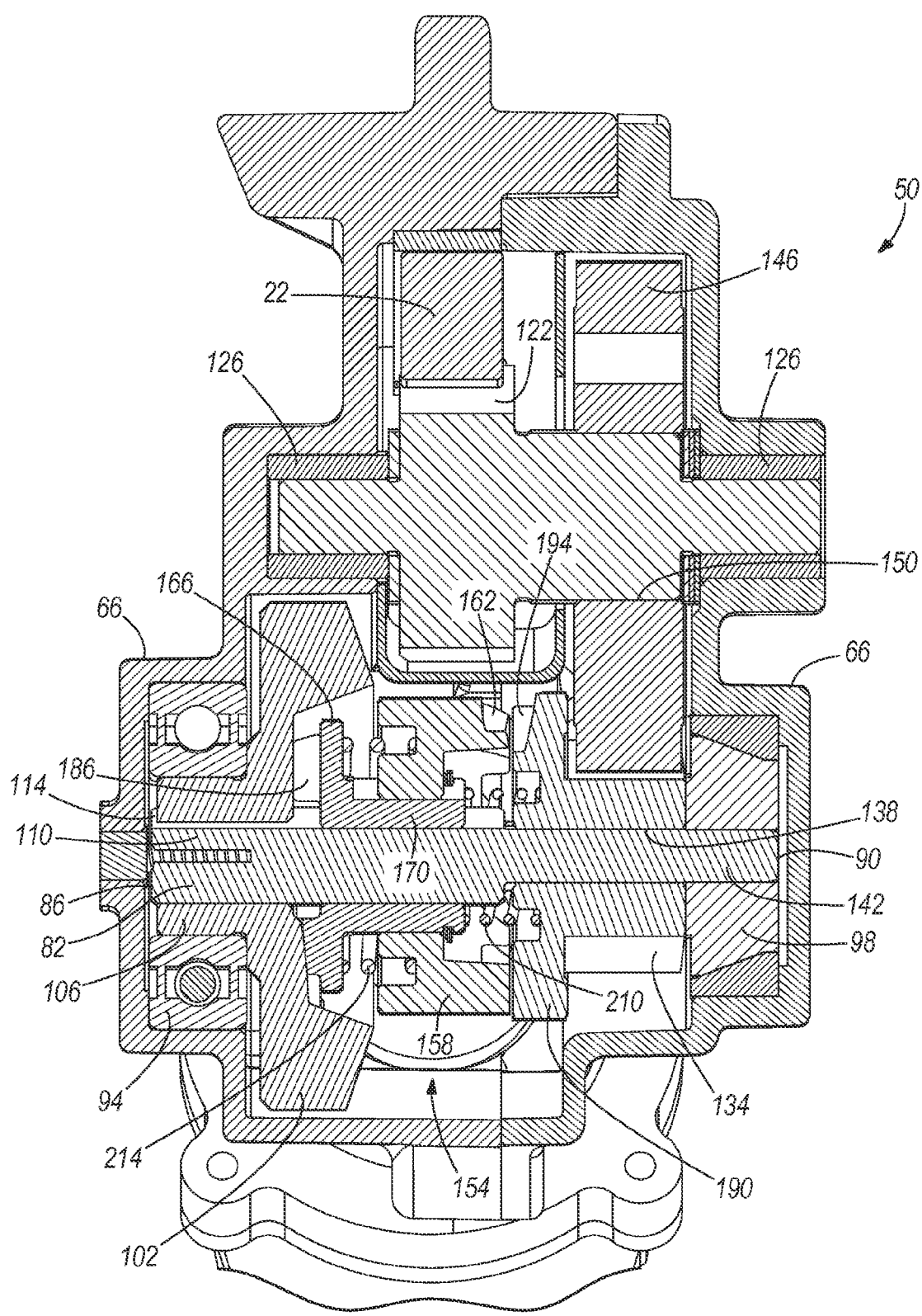
FIG. 7 is a partial cross-sectional view of the powered dispensing tool of FIG. 1 along line 7-7 in FIG. 6, illustrating a clutch of the transmission in a disengaged configuration corresponding with the orientation of the input ring and drive shaft shown in FIG. 6.

In operation of the tool 10, the input ring 102 is initially oriented relative to the drive shaft 82 such that the lugs 118 are spaced from the respective flats 114 on the drive shaft 82 (FIG. 6), and the output member 190 is in its retracted position (FIG. 7). As such, the output member 190, the speed-reducing gear train 130, and the output gear 122 may be rotated relative to the drive shaft 82 in response to the operator grasping the end 34 of the rack 22 opposite the plunger 30 and pulling the rack 22 rearward to create sufficient spacing in the cartridge housing for insertion of a tubular cartridge or a sausage pack containing caulk, adhesive, or other material to be dispensed. After the tubular cartridge or sausage pack is loaded, the rack 22 may be pushed forward to initially engage the plunger 30 with the rear of the tubular cartridge or sausage pack, causing the output member 190, the speed-reducing gear train 130, and the output gear 122 to rotate relative to the stationary drive shaft 82.

Figure 8:
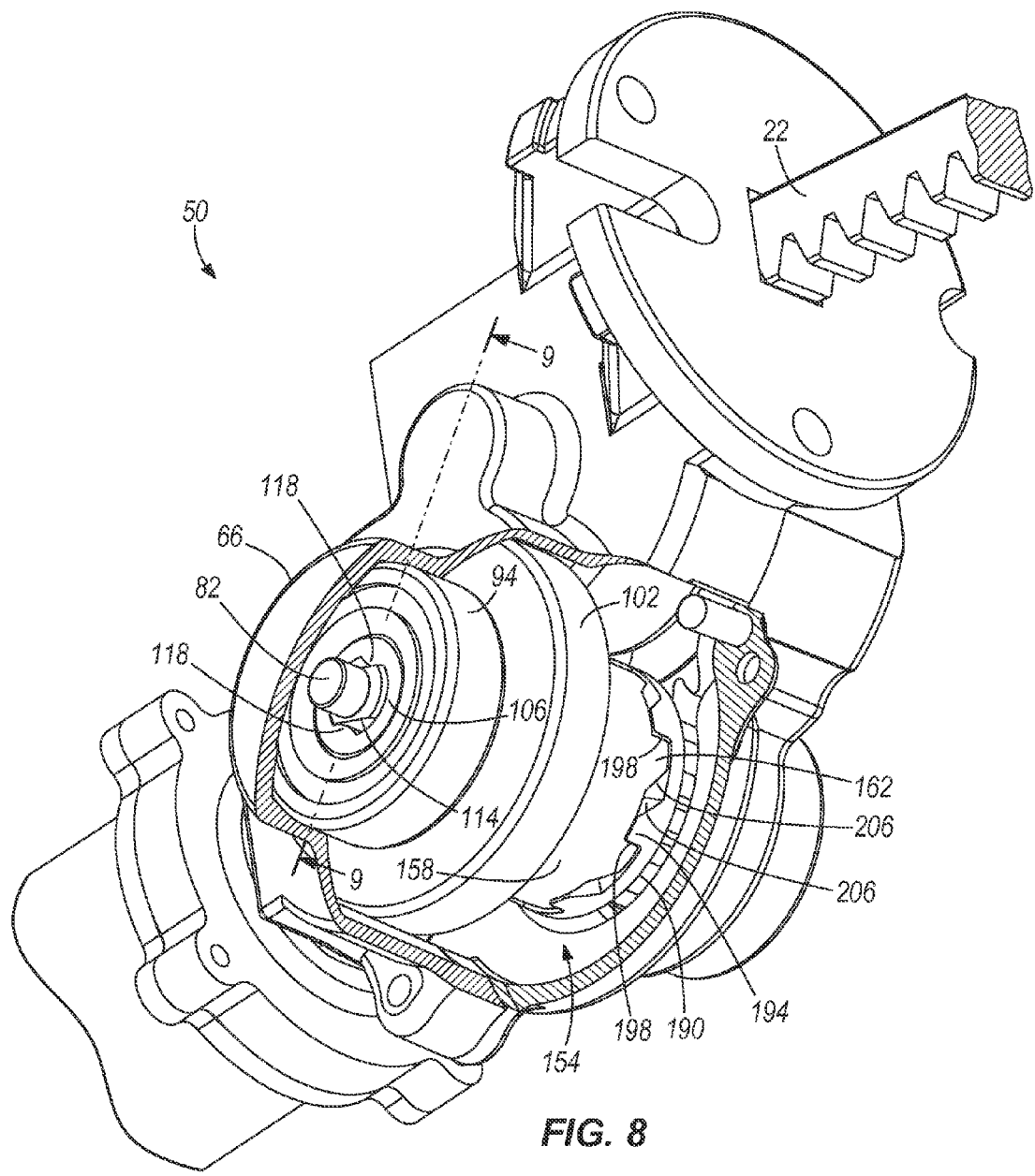
FIG. 8 is a cutaway view of the powered dispensing tool of FIG. 1, illustrating the orientation of the input ring and the drive shaft after the motor is activated.
Figure 9:
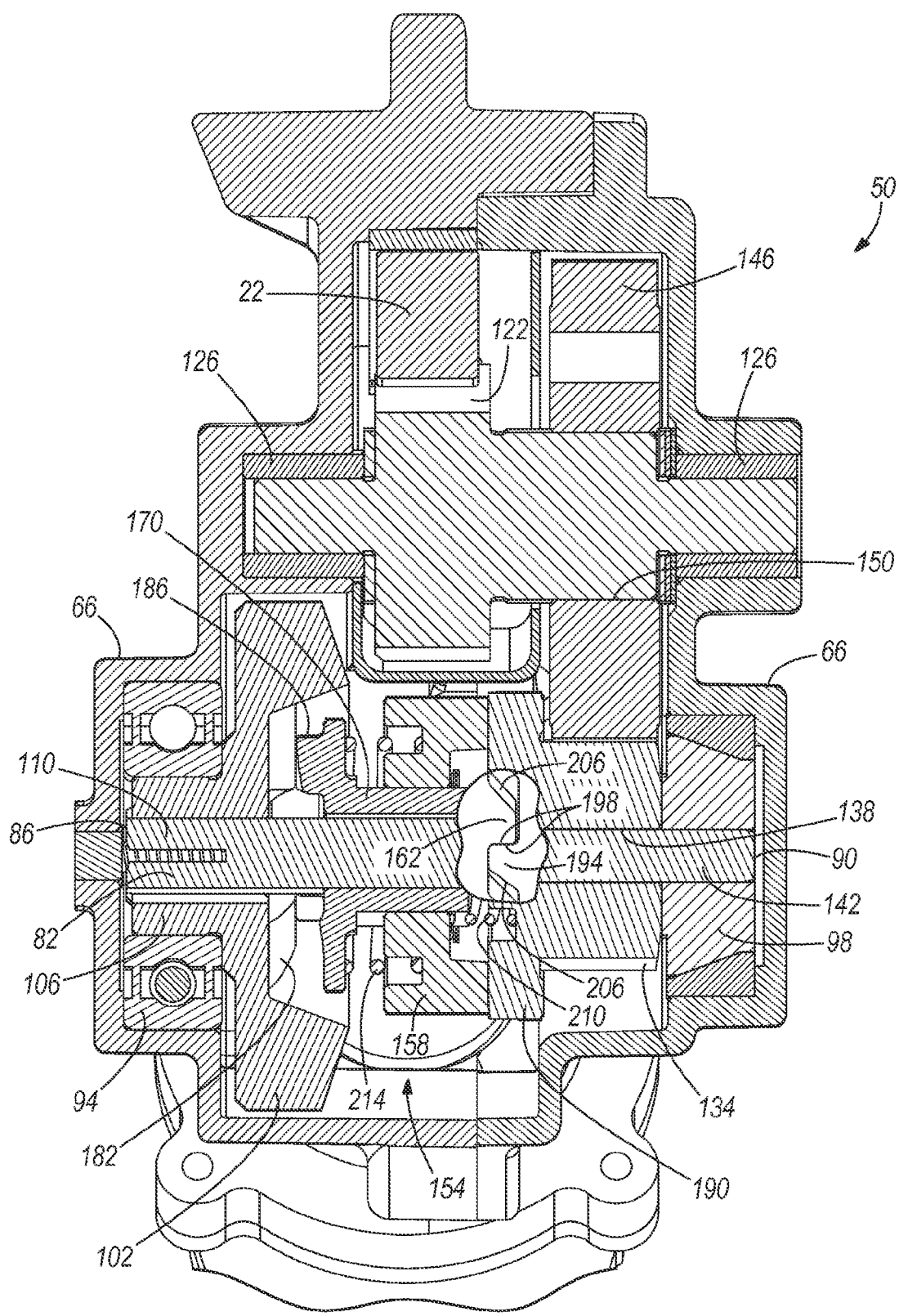
FIG. 9 is a partial cross-sectional view of the powered dispensing tool of FIG. 1 along line 9-9 in FIG. 8, illustrating the clutch in an engaged configuration corresponding with the orientation of the input ring and drive shaft shown in FIG. 8.

When the user depresses the trigger 58, the motor 42 is activated to drive the planetary transmission 46, the pinion 70, and the input ring 102. As discussed above, the motor-control circuit 274 may implement the soft-start feature to slowly accelerate the motor 42 to a desired operating speed. The input ring 102 will continue to rotate relative to the stationary drive shaft 82 until the lugs 118 engage the respective flats 114 on the drive shaft 82 (i.e., after about 40 degrees of relative rotation; see FIG. 8). During this time, the ramps 186, 182 on the slide member 166 and the input ring 102 are rotated into alignment and engage, thereby axially displacing the slide member 166 from its retracted position (FIG. 7) to its extended position (FIG. 9). If the teeth 162 of the input member 158 are aligned with the respective teeth 194 on the output member 190, the delay spring 214 is compressed. Rotation of the drive shaft 82, the slide member 166, and the input member 158 continues until the teeth 162 of the input member 158 are misaligned with the respective teeth 194 on the output member 190, at which time the delay spring 214 rebounds to cause the input member 158 to engage the output member 190.

Subsequent engagement of the drive surfaces 198 on the respective teeth 162, 194 of the input and output members 158, 190 rotationally interlocks the input member 158 and the output member 190. Torque from the drive shaft 82 is then transferred through the input member 158, through the output member 190, and to the speed-reducing gear train 130, which rotates the output gear 122 and drives the rack 22 in a forward direction to dispense caulk, adhesive, or other material from the tubular cartridge or sausage pack.

When the user releases the trigger 58, the auto-reverse circuit 282 momentarily drives the motor 42 in a reverse direction to rotate the input ring 102 relative to the drive shaft 82 in a reverse direction, thereby disengaging the lugs 118 from the respective flats 114 on the drive shaft 82. During this time, the ramps 186, 182 on the slide member 166 and the input ring 102 are misaligned and disengaged, permitting the return spring 210 to bias the input member 158 and slide member 166 toward their respective retracted positions, thereby disengaging the input member 158 from the output member 190. The output member 190, therefore, is again permitted to rotate relative to the drive shaft 82 in response to retraction of the rack 22 caused by expansion of the caulk, adhesive, or other material to be dispensed within the cartridge supported within the cartridge housing 18. Should the user of the tool 10 desire to change material cartridges, the user may grasp the end 34 of the rack 22 and pull to manually retract the rack 22 to change the cartridge.

Although the invention has been described in detail with reference to certain preferred embodiments, variations and modifications exist within the scope and spirit of one or more independent aspects of the invention as described.

What is claimed is:
1. A powered dispensing tool comprising:
   a housing;
   a motor at least partially positioned within the housing;
   a rack operably coupled to the motor for powered translation in at least one of a forward direction and a reverse direction; and a transmission selectively operably coupling the motor and the rack, the transmission including
an input ring rotatable in response to rotation of the motor in a first direction corresponding with powered translation of the rack in the forward direction,
a first clutch member engaged with the rack through at least one intermediate gear, and
a second clutch member that receives torque from the input ring and that is movable in response to rotation of the motor in the first direction toward a first position engaging the first clutch member, and movable in response to rotation of the motor in an opposite, second direction toward a second position disengaged from the first clutch member.

2. The powered dispensing tool of claim 1, wherein torque from the motor is transferred to the first clutch member via the input ring and the second clutch member when the second clutch member is in the first position.

3. The powered dispensing tool of claim 2, wherein the first clutch member is disengaged from the motor when the second clutch member is in the second position.

4. The powered dispensing tool of claim 3, wherein the rack is manually translatable in the forward direction and the reverse direction when the second clutch member is in the second position.

5. The powered dispensing tool of claim 1, further comprising:
a trigger selectively depressed by a user of the tool to activate the motor for rotation in the first direction, and
a control circuit electrically connected with the motor and operable to rotate the motor in the second direction in response to the user releasing the trigger.

6. The powered dispensing tool of claim 5, wherein the control circuit is configured to rotate the motor in the second direction for a length of time sufficient to permit the second clutch member to move from the first position to the second position.

7. The powered dispensing tool of claim 5, wherein the input ring is rotated by the motor in a second direction opposite the first direction when the motor is rotated in the second direction.

8. The powered dispensing tool of claim 1, wherein the transmission further includes a return spring positioned between the first clutch member and the second clutch member to facilitate disengagement of the first and second clutch members in response to rotation of the motor in the second direction.

9. The powered dispensing tool of claim 8, wherein the transmission further includes
a slide member positioned between the input ring and the second clutch member, and movable away from the input ring in response to rotation of the motor in the first direction, and
a delay spring positioned between the slide member and the second clutch member, the delay spring being compressible between the slide member and the second clutch member in response to the slide member moving away from the input ring, prior to engagement of the first and second clutch members.

10. The powered dispensing tool of claim 9, wherein the delay spring is configured to at least partially expand in response to engagement of the first and second clutch members.

11. The powered dispensing tool of claim 9, wherein the input ring includes a first ramp and the slide member includes a second ramp, wherein the first and second ramps are engageable in response to rotation of the input ring by the motor rotating in the first direction to move the slide member away from the input ring.

12. The powered dispensing tool of claim 11, wherein the slide member is movable away from the input ring along a central axis which coincides with a rotational axis of the input ring.

13. The powered dispensing tool of claim 11, wherein the first and second ramps are disengageable in response to rotation of the input ring by the motor rotating in the second direction to permit the return spring to disengage the first and second clutch members.

14. The powered dispensing tool of claim 1, wherein the transmission further includes
a drive shaft having a non-circular cross-sectional shape with at least one flat, and
a hub coupled for co-rotation with the input ring and having a lug engageable with the flat in response to rotation of the motor in the first direction to transfer torque to the drive shaft.

15. The powered dispensing tool of claim 14, wherein the lug is disengageable from the flat in response to rotation of the motor in the second direction, without rotating the drive shaft.

16. The powered dispensing tool of claim 1, further comprising:
a magnet attached to the rack,
a Hall-effect sensor supported by the housing, and
a stroke control circuit electrically connected to the Hall-effect sensor and the motor, wherein the stroke control circuit is operable to deactivate the motor in response to the Hall-effect sensor detecting the magnet to arrest powered translation of the rack in the forward direction.

17. The powered dispensing tool of claim 1, further comprising a current monitoring circuit electrically connected to the motor and operable to deactivate the motor in response to the electrical current drawn by the motor exceeding a predetermined current threshold for a predetermined period of time.

18. The powered dispensing tool of claim 1, further comprising a motor control circuit electrically connected to the motor and operable to accelerate the motor to an operating speed in response to initial activation of the motor.

19. The powered dispensing tool of claim 1, further comprising a case at least partially enclosing the transmission, wherein the case is at least partially enclosed by the housing.

20. The powered dispensing tool of claim 1, further comprising:
a plunger coupled to one end of the rack, and
a cartridge housing coupled to the housing and defining a longitudinal axis, wherein the plunger is movable within the cartridge housing along the longitudinal axis in response to powered translation in the forward direction, and in response to manual translation in the forward and reverse direction.

* * * * *